United States Patent [19]
DiSabatino, Jr. et al.

[11] 3,972,504
[45] Aug. 3, 1976

[54] MAIN STEAM ISOLATION CHECK VALVE

[75] Inventors: Roland DiSabatino, Jr., Cherry Hill, N.J.; Henry W. Matthews, Richboro; Mathew L. Freeman, Newtown, both of Pa.

[73] Assignee: Ametek, Inc., New York, N.Y.

[22] Filed: Dec. 2, 1974

[21] Appl. No.: 528,650

[52] U.S. Cl. .............................. 251/82; 251/83; 251/298; 137/527.4
[51] Int. Cl.² .......................................... F16K 15/18
[58] Field of Search ..................... 251/82, 83, 298; 137/527.4, 527, 527.6

[56] References Cited
UNITED STATES PATENTS

| | | | |
|---|---|---|---|
| 152,844 | 7/1874 | Johnston | 251/368 X |
| 2,312,290 | 2/1943 | Smith et al. | 137/527.4 |
| 2,496,898 | 2/1950 | Thompson et al. | 137/527.4 |
| 2,504,006 | 4/1950 | Davis | 251/82 |
| 2,717,001 | 9/1955 | Perrault | 137/527.4 X |
| 3,062,232 | 11/1962 | McGay | 251/298 X |
| 3,106,220 | 10/1963 | Hose | 251/82 X |
| 3,334,858 | 8/1967 | Hay | 251/82 |
| 3,364,944 | 1/1968 | McGay | 137/527.4 X |
| 3,883,111 | 5/1975 | Jourdan | 251/82 |

Primary Examiner—Arnold Rosenthal
Attorney, Agent, or Firm—Smythe & Moore

[57] ABSTRACT

A valve arrangement having a disc which is tapered in cross section from the center to the periphery so that upon impact closure with the seat, deformation of the disc will absorb impact energy. The valve arrangement can consist of two check valves in back-to-back relation, the valve discs being swingable relative to the seats therefor, one of the valves being held in an open position and released upon abnormal conditions so that it can close.

8 Claims, 13 Drawing Figures

THREE WAY VALVES

EXHAUST

AIR SUPPLY

MAIN STEAM ISOLATION CHECK VALVE

The present invention relates to valves having a configuration which provides a high impact strength upon rapid closing. As an example of use of the invention, in nuclear pressurized reactor plants, the nuclear reactor and several circulating systems are generally positioned within a protective containment shell. In case of rupture of any of the internal flow lines, the shell will retain radioactive liquids and will prevent gases from escaping to the atmosphere. Each nuclear reactor vessel usually has two to four flow loops which pump water or liquid through the reactor and then out through the heat exchanger, known as a steam generator, and then back through the reactor. This primary system is generally pressurized, for example, at approximately 2500 p.s.i. and operates at about 600°F. and so that the water does not boil and functions as a heat transfer medium from the reactor to the steam generator.

The secondary flow loop operates at about 1000 p.s.i. and about 550°F. Water pumped into the steam generator is turned into saturated steam by heat from the main nuclear vessel flow loop and the steam generated thereby then flows outside the containment shell to a steam turbine. Such a system needs and utilizes main steam isolation valves which are located in the secondary flow loop outside of the containment shell. There is no radioactivity in this steam of the secondary loop unless a leak should occur in the primary loop in the heat exchanger vessel.

The aforementioned main steam isolation valve organization has two functions. First, should there be a pipe rupture downstream of the main steam isolation valve, the escape of steam from the primary steam generator must be arrested in less than ten seconds. Otherwise, unloading the heat transfer medium from the generator caused by flashing of the remaining hot water at a much lower pressure will bring about an unbalance and overloading in the primary circuit of the nuclear reactor. Two to four steam lines downstream of the main steam isolation valves are generally manifolded so as to balance steam flow to the turbines should the rate of steam from one of the generators vary. If there is a line break on one of the flow lines which tends to unload one steam generator rapidly, the other generators will also be unloaded through the manifold system but such will be at a slower rate since the manifold cross piping is normally smaller than the main steam lines.

A second function of the main steam isolation valve is in case there should be a pipe break upstream of the main steam isolation valve but outside of the containment shell, the same condition results so that the flow must now be stopped in a reverse direction to normal flow. Should the break occur in the containment shell, a more serious condition exists because the remaining steam generators feeding through the manifold system and reverse flowing through the main steam isolation valve into the containment shell would over-pressurize the shell. In this situation, the stop flow action of the main steam isolation valve must occur within less than 10 seconds.

It is known to provide main isolation steam valve organization or combinations having a pair of check valves in back-to-back relation with one of the check valves being opposite to the normal direction of flow and operable by condition sensing means.

It is also known to provide various forms of flow and/or pressure sensors which normally sense excessive flow, reverse flow and/or pressure drop to operate the main steam isolation valve so it will close. This signal may take as long as 5 seconds to become established and reach the valve so that the valve must be closed within the remaining 5 seconds which presents problems.

In normal applications, a check valve is held in the open position by forward flow and as this flow drops off, the valve disc, due to its center of gravity and weight, swings back toward the seat to close the valve as flow reverses.

When such a check valve closes under pipe rupture conditions at sonic flow velocities, the velocity of the valve disc when it strikes the seat in many cases in much greater than 125 feet per second. This means that for a 24-inch valve, the energy of closure may be as much as 3 million inch pounds of impact energy which must be absorbed without structural failure of the pressure retaining the pressure containing parts of the valve disc, seat and body.

One of the objects of the invention is to provide an improved main steam isolation valve organization.

Another of the objects of the invention is to provide a structurally improved check valve which will withstand the forces encountered under rupture conditions.

In one aspect of the invention, a disc-shaped valve is arranged to close onto a valve seat, the valve being pivotally supported relative thereto. The disc is tapered in cross section from the center toward the periphery so that if closure takes place under impact conditions, the peripheral area of the disc will deform so as to absorb impact energy. The disc can be carried on arm means to that upon impact closure and deformation of the disc, damage to the arm means will be avoided. Also, the arm means being out of normal position due to overtravel allowed by deformation of the disc will not prevent proper alignment of the disc to seat during deformation.

Other objects, advantages and features of the invention will become apparent from the accompanying description and drawings, which are merely exemplary.

In the drawings.

Proceeding next to the drawings wherein like reference symbols indicate the same parts throughout the various views, a specific embodiment and modifications of the present invention will be described in detail.

Figures 1, 2, 3:
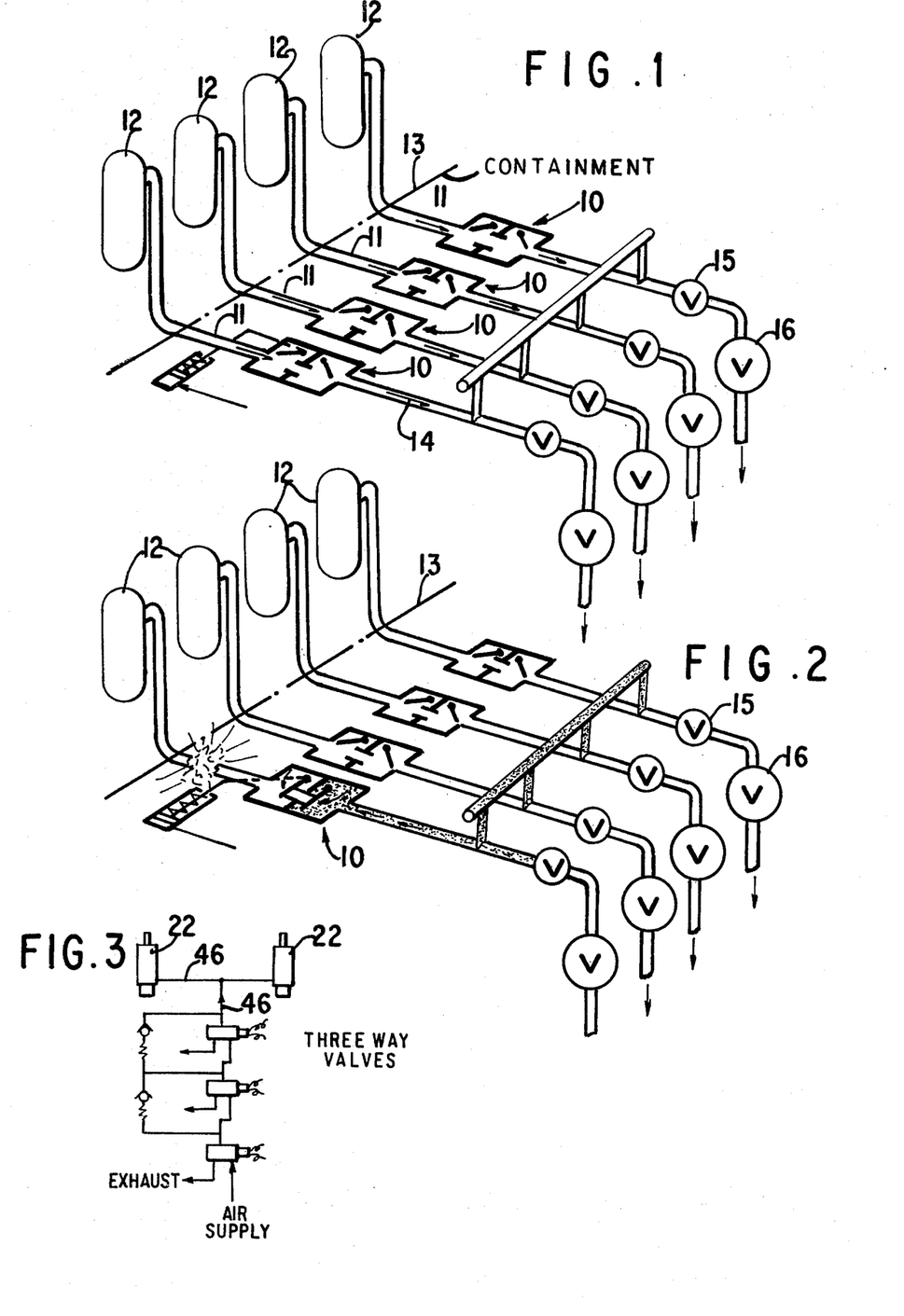
FIG. 1 is an overall schematic representation of a portion of a steam flow loop extending between a steam generator and a turbine and showing the location of the main steam isolation valve arrangement in which the present invention can be used.
FIG. 2 is a schematic view similar to that of FIG. 1 but showing the reverse flow swing check valve being closed upon a rupture occurring upstream of the isolation valve.
FIG. 3 is a diagrammatic representation of a fluid control circuit for actuating the trip check valve of the isolation valve.

An example of one use of the various aspects of the invention may be seen in FIG. 1 which shows main steam isolation valve assemblies according to the present invention indicated schematically at 10 and located in flow lines 11 of the secondary steam flow loops which flow from steam generators 12 located in the primary loops of nuclear reactors as is known in the art. The steam generators 12 are enclosed within a containment shell whose boundary is indicated at 13 and the lines 11 pass through the shell with the steam flowing in the direction indicated by arrows 14 (FIG. 1). Also contained in the lines 11 of the steam flow loops are stop valves 15 and steam turbine trip valves 16.

Figure 4:
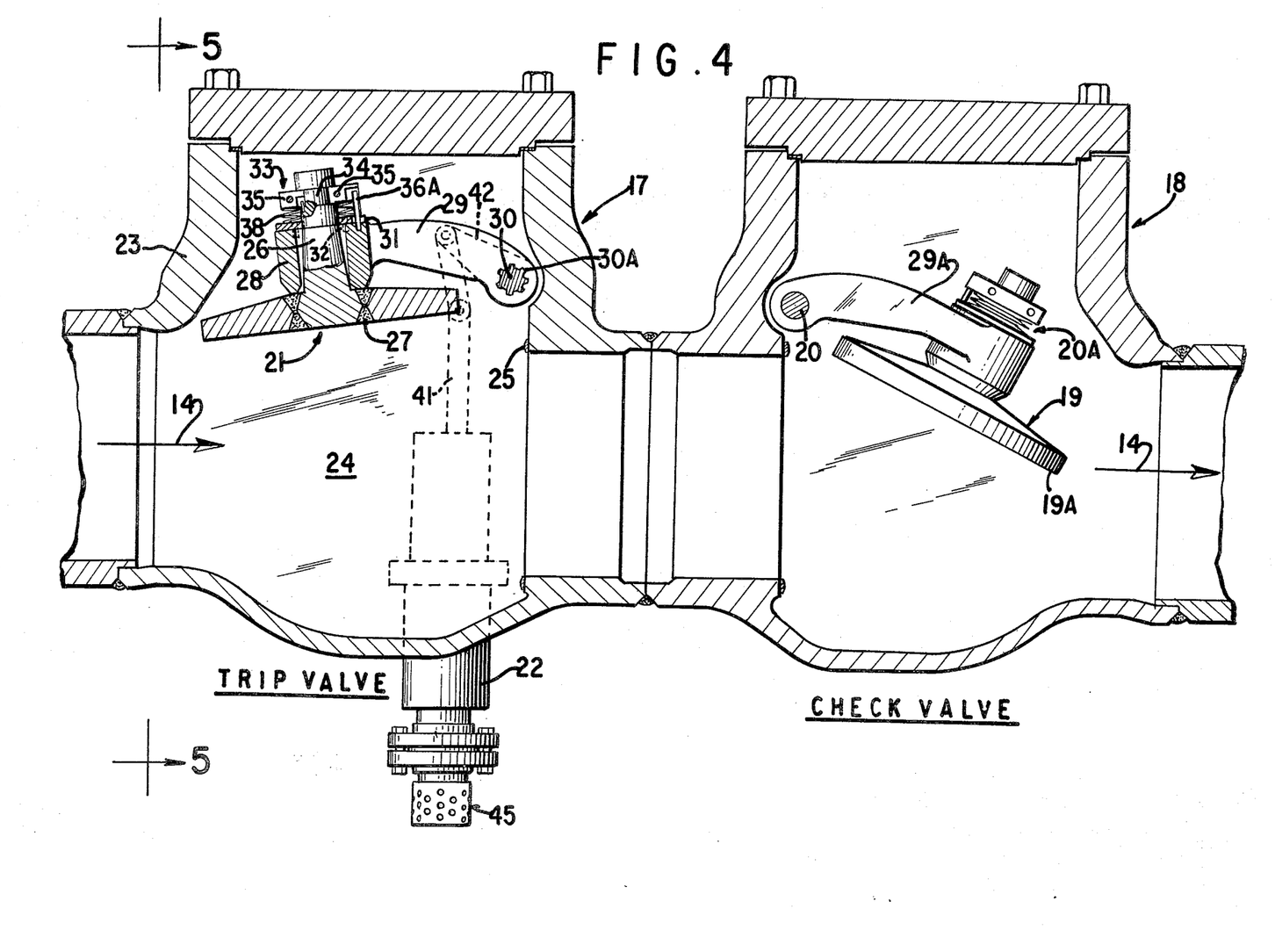
FIG. 4 is a longitudinal sectional view through an isolation valve according to the invention showing both the trip valve and the check valve in the open positions.

A main steam isolation valve assembly or combination which can employ various aspects of the invention is shown in greater detail in FIG. 4 and comprises check valves 17 and 18 which are mounted in back-to-back relationship such that the check valve 17 will operate opposite to the normal direction of flow to the check valve as indicated by flow arrows 14. The check valve 18 functions as a normal check valve in that its valve member 19 is freely pivotable about a rockshaft 20 and is maintained in the open position by flow through the check valve. When the flow stops or decreases to a predetermined value, the weight of valve member 19 will cause the valve member to be pivoted into the closed position.

The check valve 17 functions as a trip valve in that its valve member 21 is maintained in the open position by an air or fluid-loaded actuator or trip cylinder 22 which will be described subsequently in greater detail.

Trip valve 17 comprises a valve body 23 within which is a flow passage 24 through which steam flows in the direction of arrow 14. Valve seat 25 is mounted on the valve body to surround the flow passage. The valve member 21 is disc-shaped and has a thickness which gradually decreases from its center toward its peripheral edge.

Extending axially from valve member 21 is a pin 26 which is welded within the valve disc at 27 or may be forged or made integrally therewith. Pin 26 is received within a bore of a hub 28 located on the end of link 29 which is pivotally mounted upon a splined rockshaft 30. Splines 30A are used to mount the link 29 upon the rockshaft 30 rather than keyways so as to handle satisfactorily the forces encountered upon closing of the valve member and particularly rapid or high impact closing thereof.

Figure 8:
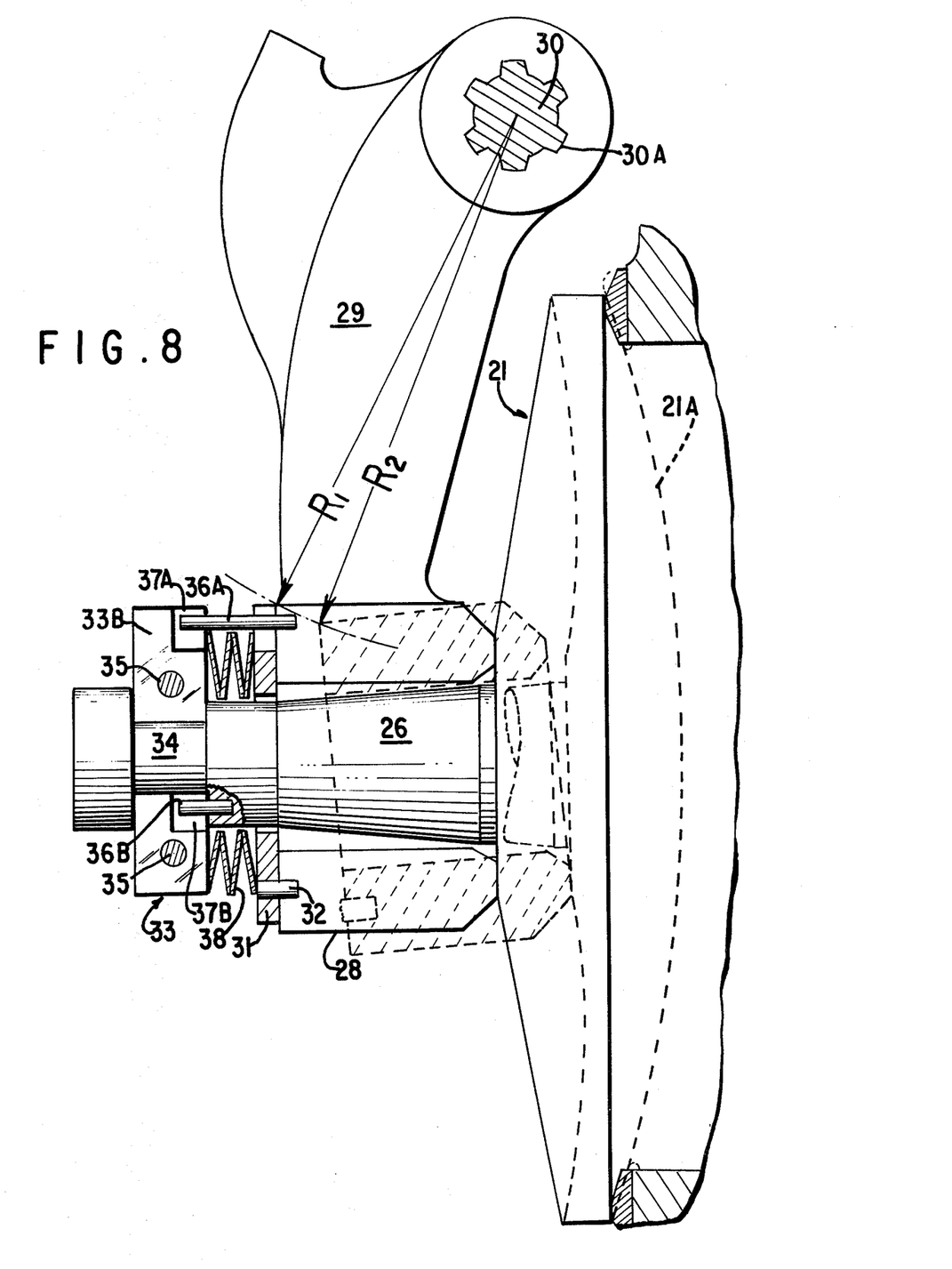
FIG. 8 is a view similar to that of FIG. 6 but in enlarged scale and showing in dash lines the position of the valve disc when closing in response to a downstream rupture.

The mounting of the valve disc upon the link 29 is shown in greater detail in FIGS. 4 and 8 wherein there is provided a shear plate 31 (FIG. 8) carried by shear pins 32 on link hub 28. Yoke 33 is mounted on pin 26. Yoke or locking plate 33 consists of two halves 33A, 33B (FIG. 5) which straddle groove or reduced section 34 of pin 26. Cap screws or fastening means 35 hold the yoke halves in assembled relation on pin 26. Stud or pin 36A is mounted on hub 28 and stud 36B is mounted on pin 26. Studs 36A and 36B engage slots 37A and 37B between the yoke halves so as to prevent rotation of the yoke, valve pin 26, and hub 28 relative to each other and yet to permit wobbling or cocking of the valve disc, pin and hub relative to each other. Disc springs 38, or other suitable means, are located between shear plate 31 and yoke 33 so as to hold the parts in assembled relation and yet to permit movement therebetween.

The foregoing described mounting of the valve member 21 upon tail link 29 permits a cocked positioning of the pin 26 in the link hub 28 when the valve disc closes in response to a rupture in the pipe as can be seen in FIG. 8. The valve disc 21 upon fast closure is deformed in its closed position as indicated at the dash lines 21A. The tail link hub 28 moving about radius $R_1$ actually changes its axial relationship with the disc pin 26. The disc pin then loads the shear plate 31 and shears the four pins 32. This permits the valve disc pin 26 to be in a cocked position relative to the tail link hub 28. By this structure, no shear stresses are applied to the pin by the cocked link hub. Such stresses could readily shear the pin from the valve disc 21 or cock the disc so as to break the seal of the disc with the valve seat 25.

By tapering the valve disc from the center to the peripheral edge, the major deformation is at the edge of the disc and practically no deformation occurs at the center. Any deformation at the center might strain the pin 26. Further, energy is absorbed by the deformation of the valve disc rather than resulting in a deformation of the valve body.

Check valve 18 also can have disc 19 thereof mounted on link 29A by a structure 20A similar to that just described for valve 17.

Figure 10:
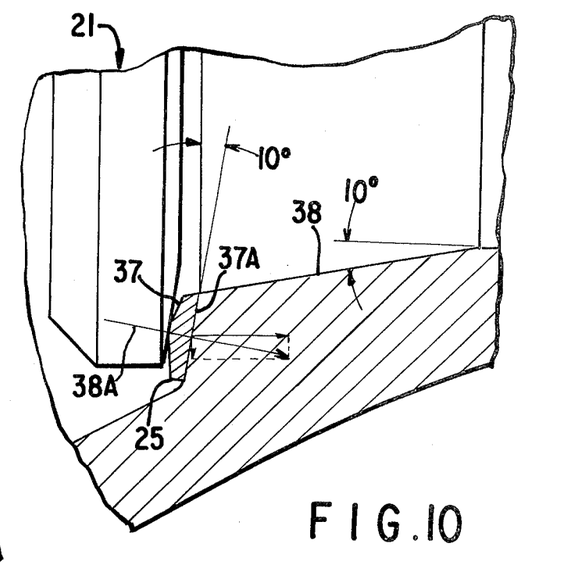
FIG. 10 is a view similar to the lower portion of FIG. 9 but showing the valve disc member seated upon a modified form of a valve seat.

As can be seen in FIG. 10, the valve seat 25 has a valve seating surface 37 mounted on valve body surface or shoulder 37A, said surface being at an angle of about 10° from the vertical. Further, the inner surface of the valve flow passage indicated at 38 is inclined at an angle of about 10° from the direction of flow therethrough. Since the closing impact of the valve disc occurs in the direction of the arrow 38A, such a mounting of the valve seat will result in a much more uniform stressing of the valve body in the region of the valve seat providing a high axial force component and a low radial force component.

Figure 5:
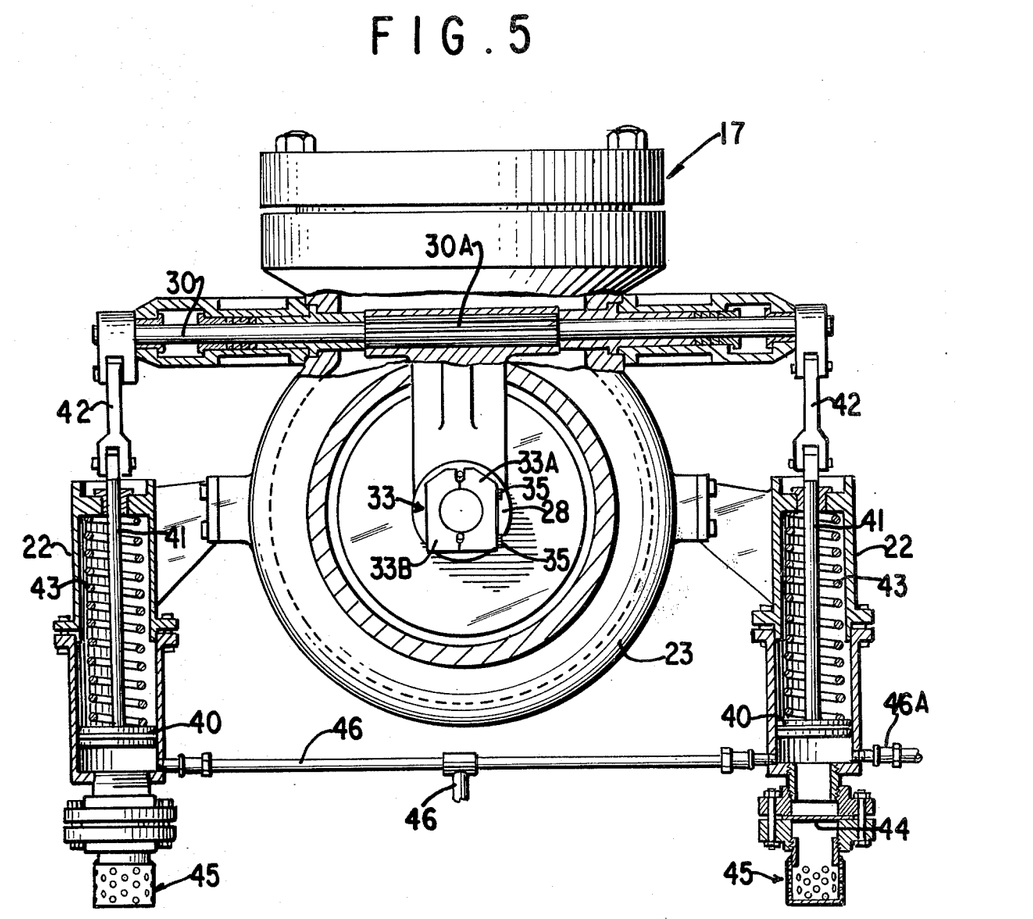
FIG. 5 is a sectional view taken in the direction of line 5—5 of FIG. 4 and showing the trip check valve in the closed position.
Figure 6:
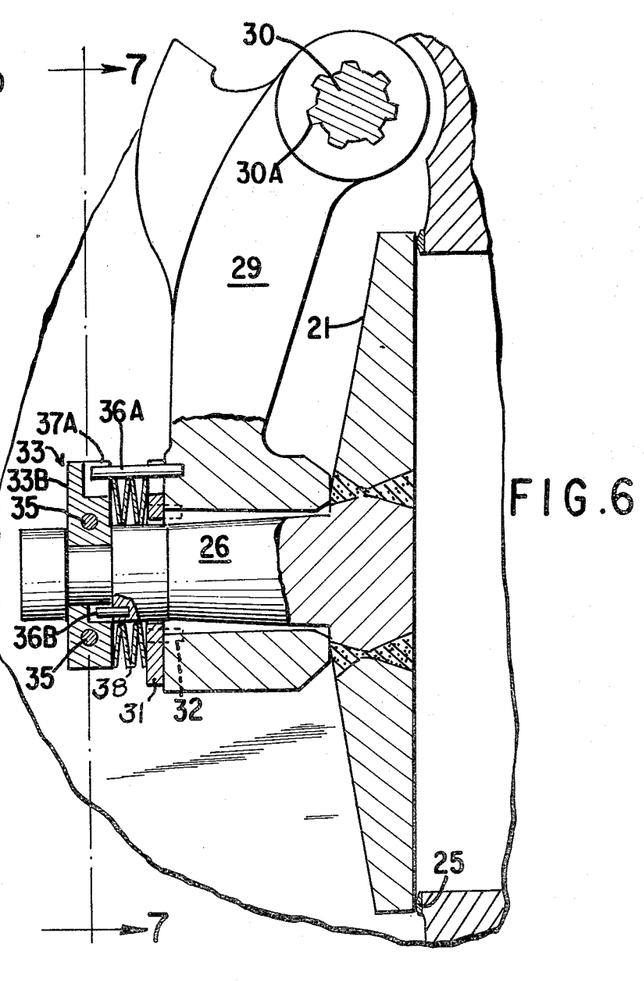
FIG. 6 is an enlarged portion of FIG. 4 showing the valve member disc of the trip valve in the closed position with a normal closure.
Figure 7:
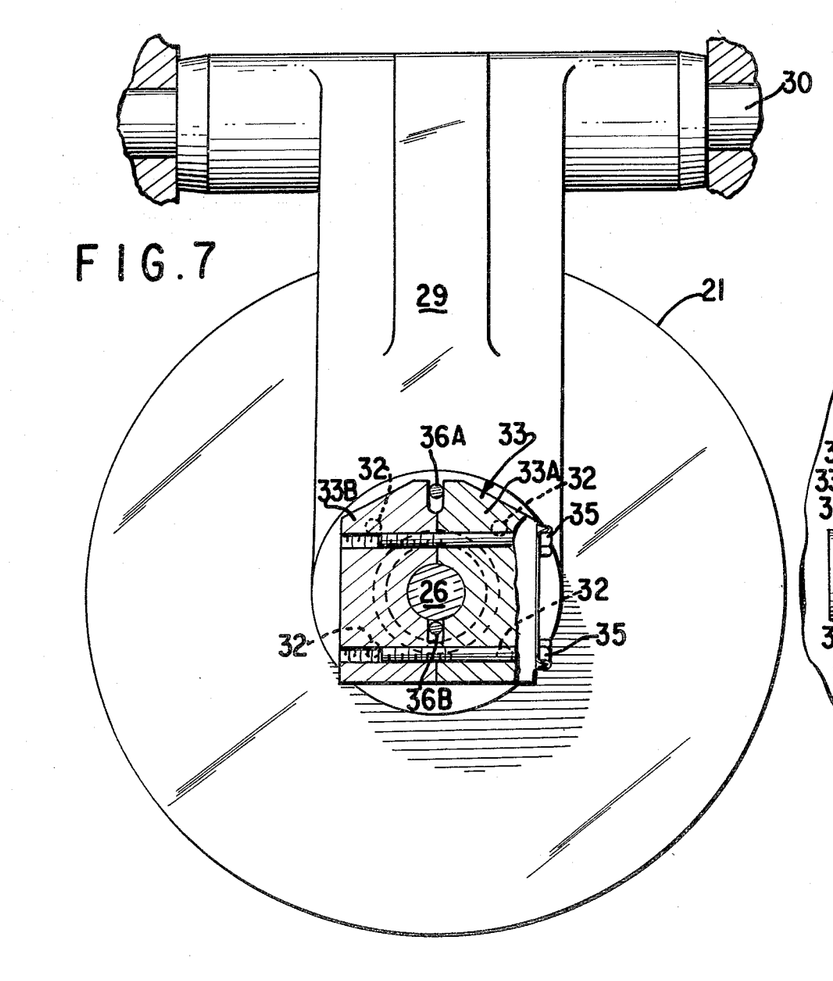
FIG. 7 is a view taken in the direction of line 7—7 of FIG. 6.

With particular reference to FIGS. 4 and 5, trip valve 23 may be provided with one or more actuator cylinders 22 as shown in FIG. 5. An actuator cylinder 22 has a piston 40 therein from which extends rod 41 which is pivotally connected by suitable linkage 42 (FIGS. 4, 5) to rockshaft 30. Within the cylinder 22 is a spring 43 which acts upon piston 40 to urge the piston and rockshaft toward closed position. Extending below the cylinder is a tubular extension within which is mounted a rupture disc 44 and below the disc is a vent 45 to atmosphere. Cylinders 22 are supplied with air under pressure through line 46.

Trip valve disc 21 is normally held open by a suitable fluid supply, such as a 100 p.s.i. air supply acting upon the piston 40 in the cylinder 22. When the valve is signaled to trip, a solenoid valve shuts off air and vents the actuator through line 46A. The compressed spring 43 starts the valve toward the closed position and the valve is immediately caught up by the steam flow through the valve and its angular velocity of closure is tremendously and rapidly increased.

In order to vent the air from cylinder 22 rather than to have the cylinder burst or to have torsional strains break the rockshaft, rupture disc 44, rated at a suitable pressure, such as 150 pounds p.s.i., is provided. The load force on the rockshaft is momentary until rupture disc 44 bursts after which there is no torsional stress applied to this shaft other than its moment of inertia due to its increasing angular velocity. The other load applied to the shaft is a double shear force caused by the centrifugal force due to the mass and velocity of the valve disc and link assembly.

The trip valve disc 21 is normally held open at an angle of about 80° by the actuator with the flow passing under the valve disc 21 at a high velocity. This high flow tends to creat some degree of instability in the disc. The force exerted by the cylinder actuator 22 holds the valve disc open against the weight of the disc and weight of link 29. This also prevents flow eddies behind the valve disc and suction force on the face of the valve disc from sucking the disc downwardly and bringing about a false closure. The spring loaded assembly also prevents wear action of the metal components.

It can be seen that trip valve 17 handles normal forward flow whereas the check valve 18 stops reverse flow. The check valve functions as a normal check held open by forward flow and does not require an actuator and its link may turn freely upon the rockshaft.

Figure 12:
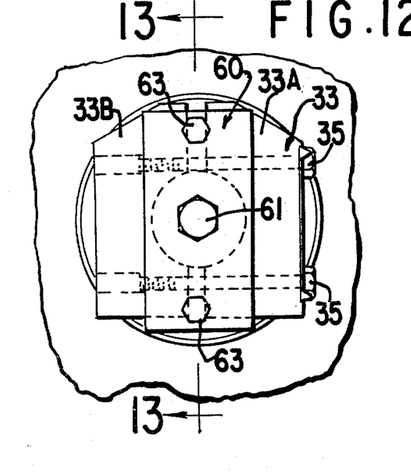
FIG. 12 is an elevational end view of a subassembly device by means of which the parts can be assembled.
Figure 13:
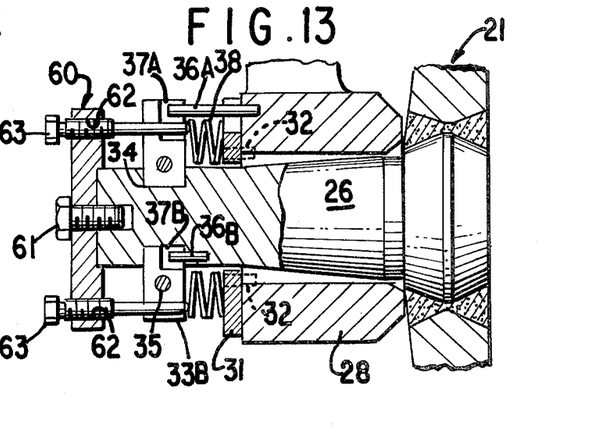
FIG. 13 is a longitudinal sectional view through FIG. 12 along the line 13—13.

FIGS. 12 and 13 show one manner of assembling the parts. If the shear pins 32 have been sheared by a rupture closing of the valve, the shear plate is replaced on hub 28 using shear pins. Studs 36A and 36B are then placed into apertures in the hub 28 and pin 26, respectively. Assembly plate 60 then is assembled to the end of pin 26 by cap screw 61, the plate being aligned so that the tapped holes 62 are on the same centerline as studs 36A, 36B. Compression screws 63 are then inserted into assembly plate 60 and spring 38 sufficiently compressed thereby so that yoke halves 33A, 33B can be slipped into groove 34. Holding screws 35 then can be inserted and tightened until the yoke halves 33A, 33B grip the disc pin 26 in groove 34, at which time the assembly plate 60 can be removed. Following this, the assembly of the yoke parts by tightening screws 35 can be completed. A locking plate may be used to prevent flow vibration from loosening screws 35.

Figure 9:
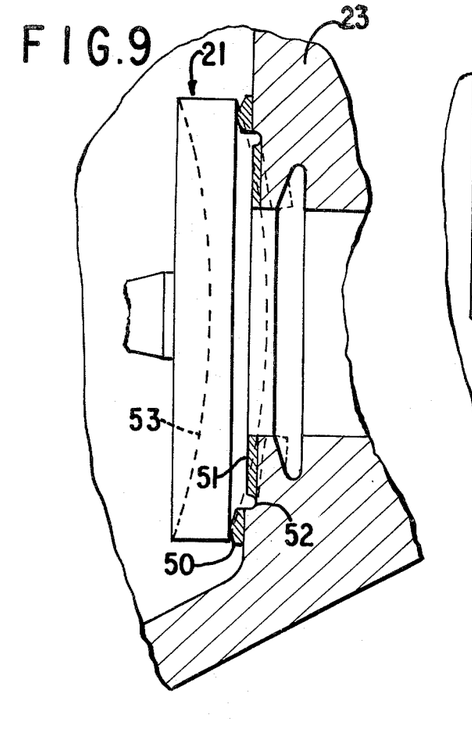
FIG. 9 is a fragmentary view in smaller scale and showing a modified valve seat.

FIG. 9 illustrates a modification of the valve seat wherein the seat is divided into ring or seat 50 and a lower or depressed ring 51, the rings being separated by an annular recess 52. Ring or seat 51 may be flat and of uniform thickness so as to give more support to the valve disc and thereby reduce stress concentration in the valve body. When the valve disc closes against the seat under impact conditions, it will take the shape shown in dash lines 53 (FIG. 9) and deform the seat and valve body as seen in exaggerated form in FIG. 9. The first or raised seat 50 is of uniform width to establish a tortuous path to prevent leakage. The second or lower seat also can be slightly conical so as to conform to the tangent to the arc of the disc as it is deformed by loading and deforming the raised outer seat.

Figure 11:
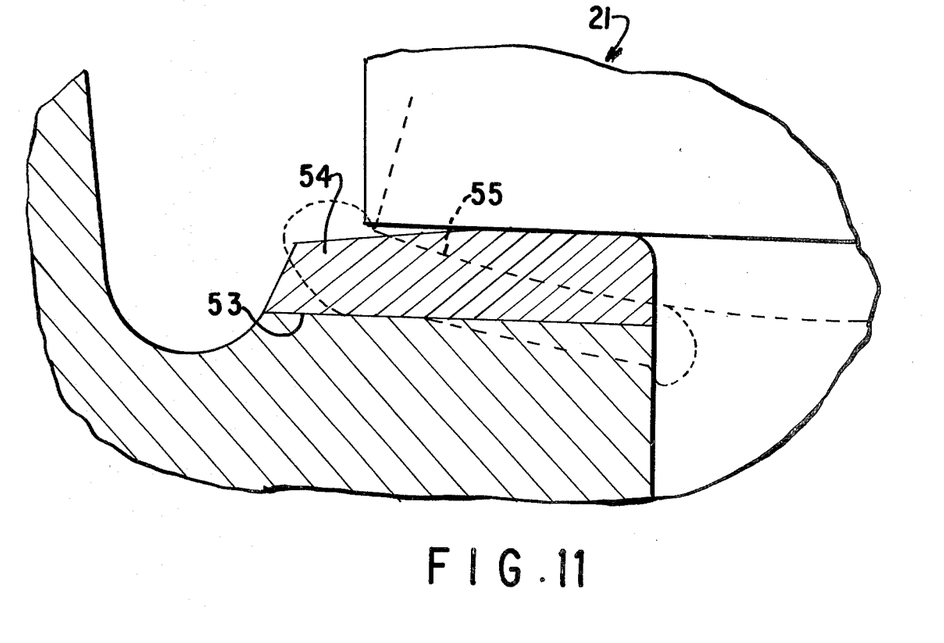
FIG. 11 is an enlarged fragmentary portion of a longitudinal section view through a valve seat and showing modifications thereof in dash lines and also showing the valve disc member in the closed position in dash lines.

Another form of valve seat is shown in FIG. 11 wherein valve body surface 53 has seat 54 thereon. The valve seat may be made of a soft steel inlay, such as 316 stainless steel or similar material, and will take the shape illustrated in exaggerated form in dash lines 55 upon impact closing of the valve disc 21.

In the impact closing, the transfer of stress is not instantaneous but may occur over a manosecond or so as the stainless steel overlay plastically deforms into a broader width in the contact with the valve disc.

The trip and check valve used as a pair to stop forward and reverse flow as shown in FIG. 4 may be used individually in combination with other types of valves such as Y-globe, gate, ball, etc., as is also practiced in the industry.

It will be understood that various details of construction and arrangement of parts may be made without departing from the spirit of the invention except as defined in the appended claims.

What is claimed is:

1. In a valve, the combination including a valve body with an annular valve seat about a passage therethrough, and a disc-shaped valve member pivotally mounted relative to said valve seat, said disc-shaped valve member having a thickness which increases from the peripheral edge thereof toward the center of said valve member, said thickness being such that said disc-shaped valve member can deform as the valve member closes on said seat to absorb impact energy, the valve seat having a softer metal overlay as compared with the material of the valve body and valve member so that the major deformation is in the disc-shaped valve member and in the softer metal overlay of the seat rather than in the body.

2. In a valve as claimed in claim 1 wherein said valve seat has a raised portion and a depressed portion with an annular recess therebetween.

3. In a valve, the combination including a valve body with an annular valve seat about a passage therethrough, a disc-shaped valve member pivotally mounted relative to said valve seat, said disc-shaped valve member having a thickness which increases from the peripheral edge thereof toward the center of said valve member, said thickness being such that said disc-shaped valve member can deform as the valve member closes on said seat to absorb impact energy, a rockshaft means for pivotally mounting said valve member, said rockshaft means including link means connecting said rockshaft means to said valve member, said valve member having an axially extending pin loosely carried in an aperture in a hub on said link means so as to allow sidewise motion therebetween upon deformation of said valve means under high impact closing conditions, and a spring loaded yoke for securing said pin to said link means.

4. In a valve as claimed in claim 3 wherein the valve is a check valve and there is a trip means connected to said disc-shaped valve member for maintaining the disc-shaped member in open position, said trip means including release means for releasing said valve member so that flow in a direction tending to close the valve will close the same.

5. In a valve as claimed in claim 4 wherein the trip means includes a fluid pressure cylinder and piston operatively connected to said valve member, spring means within the cylinder urging the piston into position to allow closure of said valve, and fluid pressure means acting upon said piston to maintain said valve member in open position under normal condition and such that venting of said fluid pressure means will cause said spring means to close said valve member.

6. In a valve, the combination including a valve body with an annular valve seat about a passage therethrough, a disc-shaped valve member pivotally mounted relative to said valve seat, said disc-shaped valve member having a thickness which increases from the peripheral edge thereof toward the center of said valve member, said thickness being such that said disc-shaped valve member can deform as the valve member closes on said seat to absorb impact energy, a rockshaft means for pivotally mounting said valve member, said rockshaft means including link means connecting said rockshaft means to said valve member, said valve member having an axially extending pin loosely carried in said link means so as to allow motion therebetween upon deformation of said valve means under high impact, closing conditions, said link means having a hub thereon with an aperture therein loosely receiving said pin, and a spring loaded yoke for securing said pin to said link means, said spring loaded yoke including a shear plate mounted with shear pins on said hub so that cocking of said hub with respect to said disc-shaped valve member upon deformation of said disc-shaped valve member can shear a connection between said yoke and pin.

7. In a valve, the combination including a valve body with an annular valve seat about a passage therethrough, a disc-shaped valve member pivotally mounted relative to said valve seat, said disc-shaped valve member having a thickness which increases from the peripheral edge thereof toward the center of said valve member, said thickness being such that said disc-shaped valve member can deform as the valve member closes on said seat to absorb impact energy, the valve being a check valve and having a trip means connected to said disc-shaped valve member for maintaining the disc-shaped member in open position, said trip means including release means for releasing said valve member so that flow in a direction tending to close the valve will close the same, the trip means including a fluid pressure cylinder and piston operatively connected to said valve member, spring means within the cylinder urging the piston into position to allow closure of said valve, fluid pressure means acting upon said piston to maintain said valve member in open position under normal condition and such that venting of said fluid pressure means will cause said spring means to close said valve member, and rupture disc means within the cylinder for further venting said cylinder after a predetermined pressure is reached.

8. In a valve, the combination including a valve body with an annular valve seat about a passage therethrough, a disc-shaped valve member pivotally mounted relative to said valve seat, said disc-shaped valve member having a thickness which increases from the peripheral edge thereof toward the center of said valve member, said thickness being such that said disc-shaped valve member can deform as the valve member closes on said seat to absorb impact energy, a rockshaft means for pivotally mounting said valve member, said rockshaft means including link means connecting said rockshaft means to said valve member, said valve member having an axially extending pin loosely carried in said link means so as to allow motion therebetween upon deformation of said valve means under high impact closing conditions, and pin means between said yoke and hub preventing rotation therebetween.

* * * * *